United States Patent [19]

Funahashi et al.

[11] Patent Number: 4,864,133

[45] Date of Patent: * Sep. 5, 1989

[54] METHOD OF ADJUSTING RADIATION IMAGE READ-OUT CONDITIONS

[75] Inventors: Takeshi Funahashi; Masamitsu Ishida, both of Kanagawa, Japan

[73] Assignee: Fuji Photo Film Co., Ltd., Kanagawa, Japan

[ * ] Notice: The portion of the term of this patent subsequent to Aug. 22, 2006 has been disclaimed.

[21] Appl. No.: 901,110

[22] Filed: Aug. 28, 1986

[30] Foreign Application Priority Data

Aug. 28, 1985 [JP] Japan .................................. 60-188859
Aug. 28, 1985 [JP] Japan .................................. 60-188860
Aug. 28, 1985 [JP] Japan .................................. 60-188861

[51] Int. Cl.$^4$ .............................................. G03C 5/16
[52] U.S. Cl. ................................ 250/327.2; 250/484.1
[58] Field of Search ....................... 250/327.2, 484.1; 364/414, 413.26; 358/282, 111; 382/515.52, 22, 54, 48; 378/99

[56] References Cited

U.S. PATENT DOCUMENTS

4,276,473  6/1981  Kato et al. ....................... 250/327.2

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a radiation image read-out method using a stimulable phosphor sheet, read-out conditions in final read-out are adjusted based on preliminary read-out image information on a region recognized as an irradiation field. To recognize the irradiation field, sample image signals are extracted from preliminary read-out image signals at a picture element string extending from an end towards the center of the stimulable phosphor sheet. Changes between image density levels represented by the sample image signals are expressed by an approximate equation, and differences between imaginary image density levels calculated by the approximate equation and the actual image density levels are calculated. Or, the image density changes are expressed by approximate equations for picture element groups, and differences between imaginary image density levels calculated by the approximate equations in each picture element group are calculated. Or, intersections of lines represented by the approximate equations and an image density change curve higher than a predetermined density level and represented by the sample image signals are detected, and the intersection nearest to the sheet end is recognized as an edge of the irradiation field.

12 Claims, 3 Drawing Sheets

METHOD OF ADJUSTING RADIATION IMAGE READ-OUT CONDITIONS

BACKGROUND OF THE INVENTION

1. Field of the Invention

This invention relates to a method of adjusting radiation image read-out conditions to optimal values in a radiation image read-out method for exposing a stimulable phosphor sheet carrying a radiation image stored thereon to stimulating rays which cause the stimulable phosphor sheet to emit light in proportion to the stored radiation energy, and photoelectrically detecting the light emitted by the stimulable phosphor sheet, thereby reading out the radiation image stored on the stimulable phosphor sheet.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in Japanese Unexamined Patent Publication No. 58(1983)-67240. In the disclosed method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out conditions such as the read-out gain and the scale factor are adjusted to appropriate values on the basis of the image input information obtained by the preliminary read-out.

As mentioned above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy, by adjusting the read-out gain and the scale factor on the basis of the detected image input information without using a read-out system having a wide dynamic range.

On the other hand, in the case where the object is the human body and a radiation image of the human body is recorded, portions of the human body not related to diagnosis should not be exposed to radiation since the radiation is harmful to the human body. Further, when the object portions not related to diagnosis are exposed to radiation, the radiation is scattered by such portions to the portion related to the diagnosis, and the contrast and resolution are adversely affected by the scattered radiation. Therefore, in many cases, the irradiation field should be limited to an area smaller than the whole recording region on the stimulable phosphor sheet when a radiation image is recorded.

However, when the irradiation field is limited, radiation scattered by the object within the irradiation field normally passes outside of the irradiation field. The scattered radiation is absorbed and stored on the stimulable phosphor sheet, which exhibits high sensitivity. Therefore, the image information obtained by the preliminary read-out includes the light emission amount caused by the scattered radiation. When the read-out conditions are adjusted based on such preliminary read-out image information, it is not always possible to adjust the read-out conditions to optimal values and therefore to obtain a visible image suitable for viewing, particularly for diagnostic purposes.

SUMMARY OF THE INVENTION

The primary object of the present invention is to provide a method of adjusting radiation image read-out conditions wherein read-out conditions are adjusted to values suitable for image information within an irradiation field by elimination of adverse effects of information outside of the irradiation field on a stimulable phosphor sheet when a radiation image stored on the stimulable phosphor sheet using a limited irradiation field is read out.

Another object of the present invention is to provide a method of adjusting radiation image read-out conditions suitable for obtaining a reproduced visible image having an improved image quality, particularly a high diagnostic efficiency and accuracy, even though the irradiation field is limited at the image recording step.

The present invention provides a method of adjusting radiation image read-out conditions for a radiation image read-out method in which preliminary read-out is conducted by exposing a stimulable phosphor sheet carrying a radiation image of an object stored thereon using a limited irradiation field to stimulating rays of a level lower than the level of stimulating rays used in final read-out and approximate detection of the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected by a light detection means to obtain electric image signals used for reproducing a visible image, read-out conditions in the final read-out are adjusted on the basis of the image information obtained by the preliminary read-out, and the final read-out is carried out by use of the adjusted read-out conditions, the method of adjusting radiation image read-out conditions comprising the steps of:

(i) extracting sample image signals at an arbitrary picture element string, which extends from an end portion of a recording region on said stimulable phosphor sheet towards the center of said recording region, from preliminary read-out image signals obtained by said preliminary read-out, (ii) expressing changes between image density levels at a predetermined number of picture elements in the vicinity of said end portion of said recording region, which are represented by said sample image signals, by an approximate equation substantially constituted by a simple equation, (iii) calculation differences between imaginary image density levels calculated by use of said approximate equation and actual image density levels represented by said sample image signals, (iv) recognizing a region up to a picture element, at which said difference becomes equal to a predetermined value, from said end portion of said recording region towards the center of said recording region as a region outside of the irradiation field, and recognizing a region inside of said region, which is recognized as a region outside of the irradiation field, as viewed in the direction from said end portion of said recording region towards the center of said recording region as the irradiation field, and (v) adjusting said read-out conditions in said final read-out on the basis of the preliminary read-out image information on said region recognized as the irradiation field.

The present invention also provides a method of adjusting radiation image read-out conditions for the aforesaid radiation image read-out method, which comprises the steps of:

(i) extracting sample image signals at an arbitrary picture element string, which extends from an end portion of a recording region on said stimulable phosphor sheet towards the center of said recording region, from preliminary read-out image signals obtained by said preliminary read-out, (ii) expressing changes between image density levels represented by said sample image signals by approximate equations $F1, F2, F3, \ldots, Fn$, which are substantially constituted by a simple equation, respectively for picture element groups $L1, L2, L3, \ldots, Ln$ divided sequentially in a direction from said end portion of said recording region towards the center of said recording region, (iii) calculating differences between imaginary image density levels calculated respectively by use of said approximate equations Fi and Fi-1 within a range of a picture element group Li wherein $2 \leq i \leq n$, (iv) recognizing a region up to a picture element, at which said difference becomes equal to a predetermined value, from said end portion of said recording region towards the center of said recording region as a region outside of the irradiation field, and recognizing a region inside of said region, which is recognized as a region outside of the irradiation field, as viewed in the direction from said end portion of said recording region towards the center of said recording region as the irradiation field, and (v) adjusting said read-out conditions in said final read-out on the basis of the preliminary read-out image information on said region recognized as the irradiation field.

The present invention further provides a method of adjusting radiation image read out conditions for the aforesaid radiation image read-out method, which comprises the steps of:

(i) extracting sample image signals at an arbitrary picture element string, which extends from an end portion of a recording region on said stimulable phosphor sheet towards the center of said recording region, from preliminary read-out image signals obtained by said preliminary read-out, (ii) expressing changes between image density levels represented by said sample image signals by approximate equations F1, F2, F3, . . ., Fn, which are substantially constituted by a simple equation, respectively for picture element groups L1, L2, L3, . . ., Ln divided sequentially in a direction from said end portion of said recording region towards the center of said recording region, (iii) expressing intersecting points of straight lines represented by said approximate equations F1, F2, F3, . . ., Fn and an image density change curve in a range higher than a predetermined density level, which is represented by said sample image signals, respectively as P1, P2, P3, . . ., Pn, and recognizing a region on a sheet center side with respect to the intersecting point nearest to said end portion of said recording region among said intersecting points P1, P2, P3, . . ., Pn as the irradiation field, and (iv) adjusting said read-out conditions in said final read-out on the basis of the preliminary read-out image information on said region recognized as the irradiation field.

With the method of adjusting radiation image read-out conditions in accordance with the present invention, it is possible to accurately ascertain the radiation image stored within the irradiation field by eliminating adverse effects of the region outside of the irradiation field in the preliminary read-out, and to adjust the read-out conditions in the final read-out to appropriate values. Accordingly, it becomes possible to reproduce a visible image having an improved image quality, particularly a high diagnostic efficiency and accuracy, even though the irradiation field is limited on the stimulable phosphor sheet at the image recording step.

DESCRIPTION OF THE PREFERRED EMBODIMENTS

The present invention will hereinbelow be described in further detail with reference to the accompanying drawings.

Figure 1:
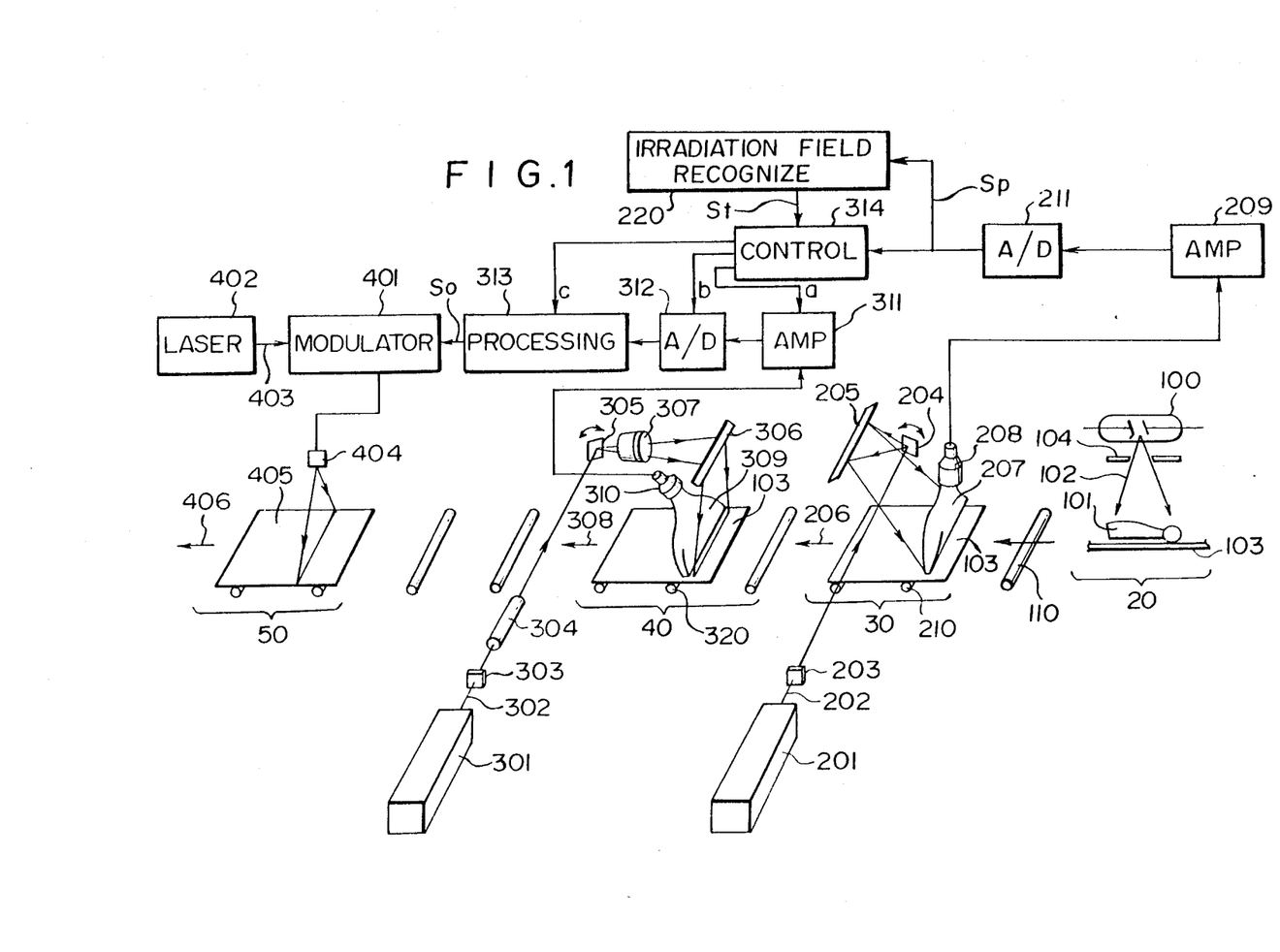
FIG. 1 is a schematic view showing the radiation image recording and reproducing system wherein read-out conditions in the final read-out are adjusted by an embodiment of the method of adjusting radiation image read-out conditions in accordance with the present invention.

Referring first to FIG. 1, the radiation image recording and reproducing system basically comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is positioned between the radiation source 100 and the object 101.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanating from a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 13 are selected so that the stimulation energy of the laser beam 202 for preliminary read-out is smaller than the stimulation energy of the laser beam for final read-out conducted at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanates from a light output face of the light guide member 207 and is received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into an electric signal carrying the image input information, and amplified by an amplifier 209. The signal generated by the amplifier 209 is digitized by an A/D converter 211, and sent as a preliminary read-out image signal Sp to a final read-out control circuit 314 at the final read-out section 40. On the basis of the image input information represented by the preliminary read-out image signal Sp, the final read-out control circuit 314 calculates a read-out gain setting value (a), a scale factor setting value (b), and a reproduced image processing condition setting value (c). The preliminary read-out image signal Sp is also sent to an irradiation field recognition circuit 220 which will be described in detail later.

After the preliminary read-out is finished, the stimulable phosphor sheet 103 is sent to the final read-out section 40. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an f8 lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the radiation energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emitted from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signal is input to an A/D converter 312 which converts the electric signal into a digital signal by use of a scale factor which has been adjusted by the scale factor setting value (b) to suit the width of signal fluctuation. The digital signal thus obtained is sent to a signal processing circuit 313, and subjected to a signal processing (image processing) such as a gradation processing based on the reproduced image processing condition setting value (c) so as to obtain a radiation image suitable for viewing, particularly for diagnostic purposes, and is output as a read-out image signal (final read-out image signal) So.

The final read-out image signal So generated by the signal processing circuit 313 is input to a light modulator 401 at the image reproducing section 50. At the image reproducing section 50, a laser beam 403 emitted by a reproducing laser beam source 402 is modulated by the light modulator 401 on the basis of the final read-out image signal So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signal So is recorded on the photosensitive material 405. For reproducing the radiation image, it is also possible to use any other appropriate method such as display on a CRT as referred to earlier.

Figure 2A:
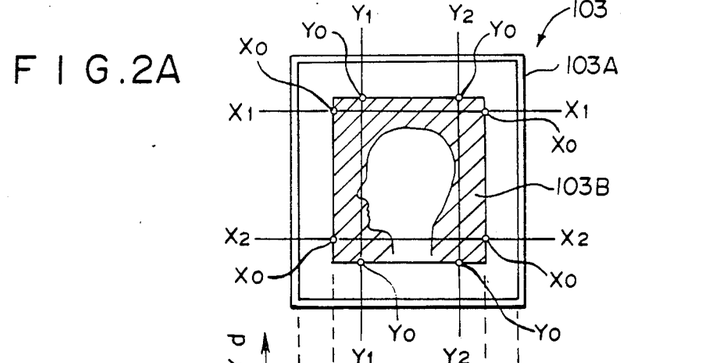
FIGS. 2A and 2B are explanatory views respectively showing examples of the irradiation field limiting condition on the stimulable phosphor sheet and changes in image density in a picture element string on the stimulable phosphor sheet.

When a radiation image is recorded on the stimulable phosphor sheet 103, the irradiation field stop 104 may be operated to limit the irradiation field as shown in FIG. 2A. In this case, an irradiation field (sheet portion where the image is recorded) 103B is formed at a part within a recording region 103A on the stimulable phosphor sheet 103. In the case where the read-out gain and the scale factor as the final read-out conditions are adjusted based on the preliminary read-out image signals Sp over the whole area of the recording region 103A on the stimulable phosphor sheet 103, the adjusted final read-out conditions become inappropriate for the image stored within the irradiation field 103B. Accordingly, the irradiation field recognition circuit 220 recognizes the irradiation field 103B based on the preliminary read-out image signals Sp, and sends a signal St representing the irradiation field 103B to the control circuit 314. The control circuit 314 adjusts the read-out gain setting value (a) and the scale factor setting value (b) based only on the preliminary read-out image signals Sp within the irradiation field 103B represented by the irradiation field signal St.

Figure 2B:
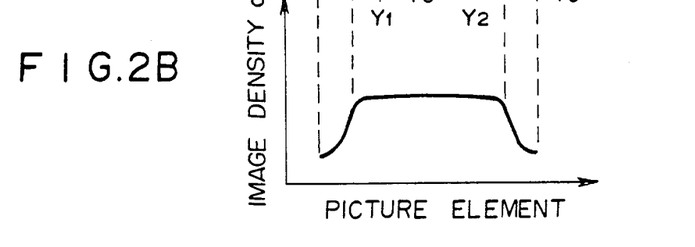
Figure 3:
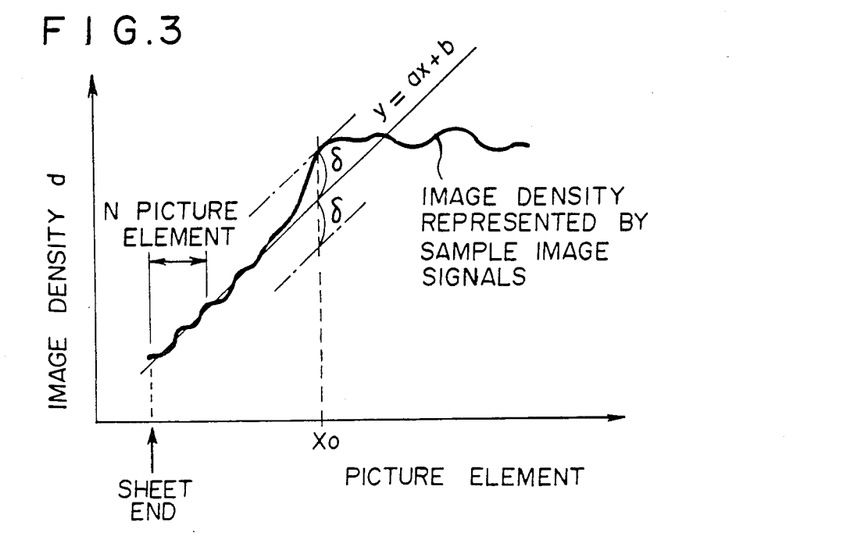
FIG. 3 is an explanatory graph showing the embodiment of the method of adjusting radiation image read-out conditions in accordance with the present invention.

Recognition of the irradiation field by the irradiation field recognition circuit 220 will now be described in detail below. The irradiation field recognition circuit 220 extracts sample image signals in an arbitrary picture element string extending from an end portion of the recording region on the stimulable phosphor sheet 103 towards the center thereof as indicated by the X1—X1 line in FIG. 2A, for example a picture element string in the main scanning direction, from the whole preliminary read-out image signals Sp received from the A/D converter 211. In general, changes in image density d represented by the sample image signals thus extracted become as shown in FIG. 2B. Specifically, within the irradiation field 103B, the image density d is comparatively high and changes in accordance with the image stored on the stimulable phosphor sheet 103. In the region beyond the edge portion of the irradiation field 103B, i.e. in the region outside of the irradiation field, the image density d becomes lower than the image density within the irradiation field 103B. Since radiation scattered by the object impinges upon the region outside of the irradiation field and the amount of the scattered radiation decreases gradually from the edge portion of the irradiation field 103B towards the end portion of the recording region on the stimulable phosphor sheet 103, the image density d in the region outside of the irradiation field changes as shown in FIG. 2B. FIG. 3 shows the changes in the image density d in the vicinity of the edge portion of the irradiation field 103B. As shown in FIG. 3, the image density d changes comparatively moderately and linearly in the vicinity of the end portion of the stimulable phosphor sheet 103, and increases sharply near the irradiation field 103B.

As shown in FIG. 3, the irradiation field recognition circuit 220 expresses the linear changes in the image density d between a predetermined number N of picture elements in the vicinity of the end portion of the stimulable phosphor sheet 103 by an approximate equation constituted, for example, by a simple equation $y = ax + b$, by use of a known method. The approximate equation may also be any other equation of high order insofar as it substantially expresses a straight line.

Based on the approximate equation, the irradiation field recognition circuit 220 then calculates an imaginary image density d' at each picture element of the picture element string, and calculates the difference $|d-d'|$ between the actual image density d and the imaginary image density d' at each picture element. Thereafter, the irradiation field recognition circuit 220 compares the density difference $|d-d'|$ with a predetermined density difference δ, starting from the picture element at the end portion of the stimulable phosphor sheet 103. The density difference $|d-d'|$ is small in the vicinity of the end portion of the stimulable phosphor sheet 103, and exceeds the predetermined density difference δ at a picture element Xo at the edge portion of the irradiation field 103B. Therefore, the irradiation field recognition circuit 220 recognizes the 10 picture element Xo, at which the density difference $|d-d'|$ comes to exceed the predetermined density difference δ for the first time in the aforesaid comparison, as an irradiation field edge picture element. The value suitable as the predetermined density difference δ may be selected experimentally. The aforesaid analysis is conducted also for the opposite end portion of the stimulable phosphor sheet 103, and irradiation field edge picture elements Xo, Xo as shown in FIG. 2A are detected for the picture element string X1—X1.

The irradiation field recognition circuit 220 carries out the aforesaid analysis, for example, also for a picture element string X2—X2 parallel to the picture element string X1—X1, and picture element strings Y1—Y1 and Y2—Y2 which are normal to the picture element strings X1—X1 and X2—X2 as shown in FIG. 2A, and thereby detects other irradiation field edge picture elements Xo and Yo. The irradiation field recognition circuit 220 recognizes the region beyond than the irradiation field edge picture elements Xo and Yo as the region outside of the irradiation field, and the region within the irradiation field edge picture elements Xo and Yo as the irradiation field 103B, and sends the irradiation field signal St representing the irradiation field 103B to the control circuit 314 as mentioned above. When the control circuit 314 adjusts the read-out gain setting value (a) and the scale factor setting value (b) based on the preliminary read-out image signals Sp within the irradiation field 103B represented by the signal St, the read-out conditions thus adjusted are free from adverse effects of the information stored in the region outside of the irradiation field, and become optimal for the radiation image actually stored inside of the irradiation field 103B.

Another embodiment of the method of adjusting radiation image read-out conditions in accordance with the present invention will hereinbelow be described with reference to FIG. 4. In this embodiment, the irradiation field recognition circuit 220 expresses the image density changes in picture element groups L1, L2, L3, . . ., Ln of the picture element string X1—X1, which comprise a predetermined number N of picture elements and are divided in the direction from the end portion of the stimulable phosphor sheet 103 toward the center thereof, respectively by approximate equations F1, F2, F3, . . ., Fn constituted, for example, by a simple equation $y = ax + b$, by use of a known method. The approximate equations may also be any other equations of high order insofar as they substantially express a straight line.

Figure 4:
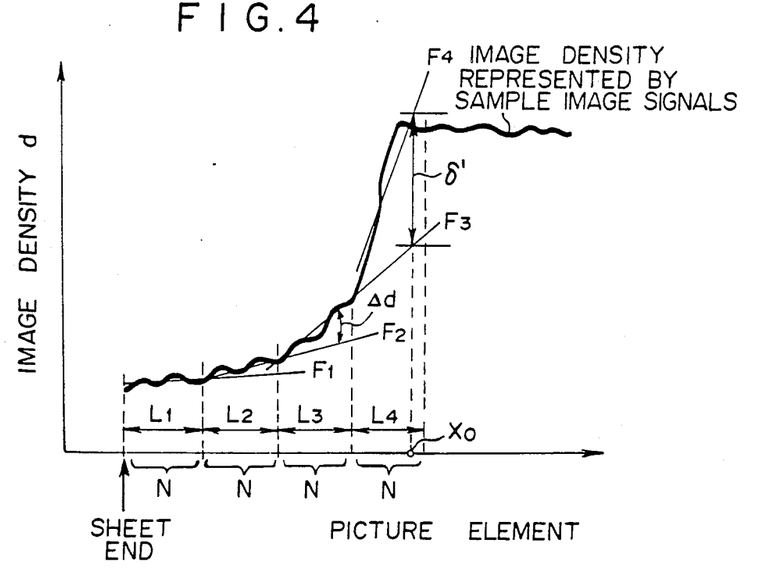
FIG. 4 is an explanatory graph showing another embodiment of the method of adjusting radiation image read-out conditions in accordance with the present invention.

In the embodiment of FIG. 4, the irradiation field recognition circuit 220 then calculates the differences between imaginary image density levels calculated by the approximate equations Fi and Fi−1 in the range of each picture element group Li wherein $2 \leq i \leq n$. For example, in the third picture element group L3 as counted from the end portion side of the stimulable phosphor sheet 103, the difference Δd between an imaginary image density level calculated by the approximate equation F3 and an imaginary image density level calculated by extrapolation of the approximate equation F2 is calculated. Then, the irradiation field recognition circuit 220 compares the difference Δd with the predetermined density difference δ' starting from the picture element on the end portion side of the stimulable phosphor sheet 103. In each picture element group Li, the difference Δd becomes larger at a picture element closer to the center side of the stimulable phosphor sheet 103. However, in the next picture element group Li+1, the difference Δd returns to a small value. Therefore, in the region in the vicinity of the end portion of the stimulable phosphor sheet 103, the difference Δd does not become so large. However, as mentioned above, since the image density d increases sharply near the irradiation field 103B, the difference Δd exceeds the predetermined density difference δ' for the first time at the picture element Xo at the edge portion of the irradiation field 103B. Accordingly, the irradiation field recognition circuit 220 recognizes the picture element Xo, at which the image density difference Δd exceeds the predetermined density difference δ for the first time in the aforesaid comparison, as an irradiation field edge picture element. The irradiation field recognition circuit 220 conducts the aforesaid analysis also for the opposite end portion of the stimulable phosphor sheet 103, and detects the irradiation field edge picture elements Xo, Xo for the picture element string X1—X1 as shown in FIG. 2A. In the same manner, the irradiation field recognition circuit 220 analyzes, for example, also for the picture element strings X2—X2, Y1—Y1 and Y2—Y2, and detects the other irradiation field edge picture elements Xo and Yo. Thereafter, the irradiation field recognition circuit 220 recognizes the irradiation field 103B based on the irradiation field edge picture elements Xo and Yo in the same manner as mentioned with reference to FIG. 3, and sends the irradiation field signal St to the control circuit 314.

In this embodiment, instead of making the region widths of the picture element groups L1, L2, L3, ..., Ln equal to each other and adjusting them to number N of picture elements, the region widths may also be changed between the picture element groups. For example, the region widths may be adjusted to a function of the sequence i as counted from the sheet end side of each picture element group. Suitable region widths may be selected experimentally. Also, the predetermined density difference δ' compared with the density difference Δd need not necessarily be a fixed value, and may be calculated as a function of the sequence i or the like.

Figure 5:
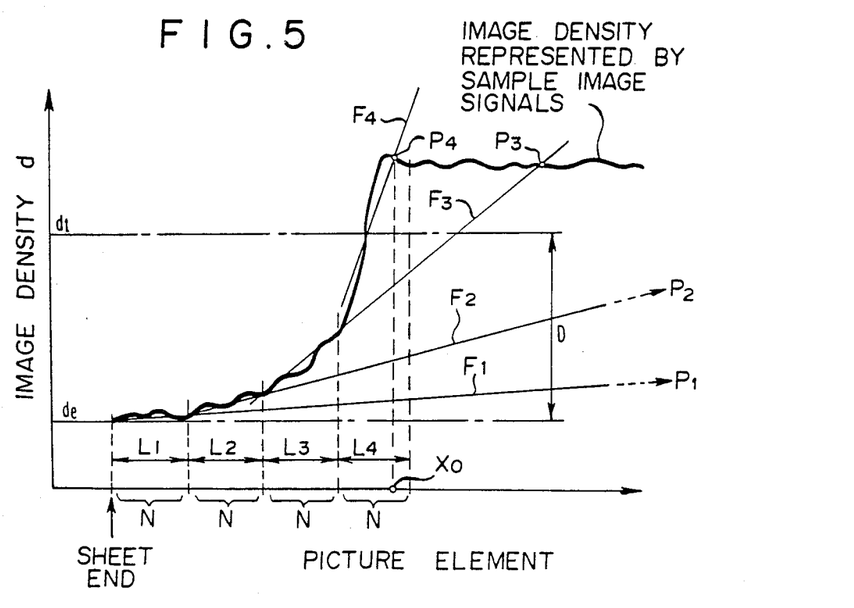
FIG. 5 is an explanatory graph showing a further embodiment of the method of adjusting radiation image read-out conditions in accordance with the present invention.

A further embodiment of the method of adjusting radiation image read-out conditions in accordance with the present invention will hereinbelow be described with reference to FIG. 5. In this embodiment, the irradiation field recognition circuit 220 expresses the image density changes in picture element groups L1, L2, L3, ..., Ln of the picture element string X1—X1, which comprise a predetermined number N of picture elements, respectively by approximate equations F1, F2, F3, ..., Fn as mentioned with reference to FIG. 4.

Then, the irradiation field recognition circuit 220 detects intersecting points P1, P2, P3, ..., Pn of straight lines represented by the approximate equations F1, F2, F3, Fn and an image density change curve represented by the sample image signals. In this case, the range of the image density change curve is limited to the range of the image density d higher than a predetermined density level d+, for example, the range of the image density d higher by a predetermined value D than the image density d+ at the picture element at the end portion of the stimulable phosphor sheet 103. Therefore, intersecting points of the respective straight lines and the image density change curve in the vicinity of the end portion of the stimulable phosphor sheet 103, which indicates the amounts of scattered radiation, are not detected, and the intersecting points of the aforesaid straight lines and the image density change curve representing the image within the irradiation field are detected, one for each straight line. The value suitable as the predetermined density δ may be selected experimentally.

Thereafter, the irradiation field recognition circuit 220 judges the picture element Xo corresponding to the intersecting point P4 nearest to the end portion of the stimulable phosphor sheet 103 among the intersecting points P1, P2, P3, ..., Pn as the irradiation field edge picture element. Specifically, since the image density d sharply increases approximately in a form convex towards the lower density side at picture elements closer to the irradiation field 103B, the intersecting point nearest to the end portion of the stimulable phosphor sheet 103 is present at the edge portion of the irradiation field 103B. The irradiation field recognition circuit 220 conducts the aforesaid analysis also for the opposite end portion of the stimulable phosphor sheet 103, and detects the irradiation field edge picture elements Xo, Xo for the picture element string X1—X1 as shown in FIG. 2A. In the same manner, the irradiation field recognition circuit 220 analyzes, for example, also for the picture element strings X2—X2, Y1—Y1 and Y2—Y2, and detects the other irradiation field edge picture elements Xo and Yo. Thereafter, the irradiation field recognition circuit 220 recognizes the irradiation field 103B based on the irradiation field edge picture elements Xo and Yo in the same manner as mentioned with reference to FIG. 3, and sends the irradiation field signal St to the control circuit 314.

In the embodiment mentioned last, the region widths of the picture element groups L1, L2, L3, ..., Ln may be changed as described with reference to FIG. 4.

In all of the aforesaid embodiments, the image processing condition setting value (c) is also adjusted based on only the preliminary read-out image signals Sp within the irradiation field 103B to a value optimal for the radiation image stored inside of the irradiation field 103B.

The picture element strings where the sample image signals are extracted are not limited to the two horizontal strings X1—X1, X2—X2 and the two vertical strings Y1—Y1, Y2—Y2 on the stimulable phosphor sheet 103 as shown in FIG. 2A. The method of extracting the sample image signals as shown in FIG. 2A is advantageous for the case where the shape of the irradiation field 103B is fixed, for example, to a square on the stimulable phosphor sheet 103, and the irradiation field recognition circuit 220 is constituted to recognize the square irradiation field 103B. In the case where the shape of the irradiation field 103B is not fixed, extraction of the sample image signals should be conducted on many picture element strings positioned comparatively close to each other, and the region inside of a boundary line formed by connecting many irradiation field edge picture elements is thus obtained as the irradiation field.

As described, for example, in Japanese Unexamined Patent Publication No. 58(1983)-67242, a single read-out system may be used for the preliminary read-out and the final read-out. In this case, after the preliminary read-out is completed, the stimulable phosphor sheet is returned to the read-out system by a sheet conveyance means and the final read-out is then conducted. In the preliminary read-out step, the energy of the stimulating rays is adjusted to be lower than the energy of stimulating rays used in the final read-out. The present invention is also applicable to such a case.

We claim:

1. A method of adjusting radiation image read-out conditions for a radiation image read-out method in which preliminary read-out is conducted by exposing a stimulable phosphor sheet carrying a radiation image of an object stored thereon using a limited irradiation field to stimulating rays of a level lower than the level of stimulating rays used in final read-out and approximately detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected by a light detection means to obtain electric image signals used for reproducing a visible image, read-out conditions in the final read-out are adjusted on the basis of the image information obtained by the preliminary read-out, and the final read-out is carried out by use of the adjusted read-out conditions, the method of adjusting radiation image read-out conditions comprising the steps of:
(i) extracting sample image signals at an arbitrary picture element string, which extends from an end portion of a recording region on said stimulable phosphor sheet towards the center of said recording region, from preliminary read-out image signals obtained by said preliminary read-out,
(ii) expressing changes between image density levels at a predetermined number of picture elements in the vicinity of said end portion of said recording region, which are represented by said sample image signals, by an approximate equation substantially constituted by a simple equation,
(iii) calculating differences between imaginary image density levels calculated by use of said approximate equation and actual image density levels represented by said sample image signals,
(iv) recognizing a region up to a picture element, at which said difference becomes equal to a predetermined value, from said end portion of said recording region towards the center of said recording region as a region outside of the irradiation field, and recognizing a region inside of said region, which is recognized as a region outside of the irradiation field, as viewed in the direction from said end portion of said recording region towards the center of said recording region as the irradiation field, and
(v) adjusting said read-out conditions in said final read-out on the basis of the preliminary read-out image information on said region recognized as the irradiation field.

2. A method of adjusting radiation image read-out conditions as defined in claim 1 wherein said irradiation field is of a square shape, and said sample image signals are extracted at two horizontal picture element strings and two vertical picture element strings on said stimulable phosphor sheet.

3. A method of adjusting radiation image read-out conditions as defined in claim 1 wherein said read-out conditions in said final read-out are a read-out gain and a scale factor.

4. A method of adjusting radiation image read-out conditions as defined in claim 1 wherein said stimulating rays are a laser beam.

5. A method of adjusting radiation image read-out conditions for a radiation image read-out method in which preliminary read-out is conducted by exposing a stimulable phosphor sheet carrying a radiation image of an object stored thereon using a limited irradiation field to stimulating rays of a level lower than the level of stimulating rays used in final read-out and approximate detection of the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected by a light detection means to obtain electric image signals used for reproducing a visible image, read-out conditions in the final read-out are adjusted on the basis of the image information obtained by the preliminary read-out, and the final read-out is carried out by use of the adjusted read-out conditions, the method of adjusting radiation image read-out conditions comprising the steps of:
(i) extracting sample image signals at an arbitrary picture element string, which extends from an end portion of a recording region on said stimulable phosphor sheet towards the center of said recording region, from preliminary read-out image signals obtained by said preliminary read-out,
(ii) expressing changes between image density levels represented by said sample image signals by approximate equations $F_1, F_2, F_3, \ldots, F_n$, which are substantially constituted by a simple equation, respectively for picture element groups $L_1, L_2, L_3, \ldots, L_n$ divided sequentially in a direction from said end portion of said recording region towards the center of said recording region,
(iii) calculating differences between imaginary image density levels calculated respectively by use of said approximate equations $F_i$ and $F_{i-1}$ within a range of a picture element group $L_i$ wherein $2 \leq i \leq n$,
(iv) recognizing a region up to a picture element, at which said difference becomes equal to a predetermined value, from said end portion of said recording region towards the center of said recording region as a region outside of the irradiation field, and recognizing a region inside of said region, which is recognized as a region outside of the irradiation field, as viewed in the direction from said end portion of said recording region towards the center of said recording region as the irradiation field, and
(v) adjusting said read-out conditions in said final read-out on the basis of the preliminary read-out image information on said region recognized as the irradiation field.

6. A method of adjusting radiation image read-out conditions as defined in claim 5 wherein said irradiation field is of a square shape, and said sample image signals are extracted at two horizontal picture element strings and two vertical picture element strings on said stimulable phosphor sheet.

7. A method of adjusting radiation image read-out conditions as defined in claim 5 wherein said read-out conditions in said final read-out are a read-out gain and a scale factor.

8. A method of adjusting radiation image read-out conditions as defined in claim 5 wherein said stimulating rays are a laser beam.

9. A method of adjusting radiation image read-out conditions for a radiation image read-out method in which preliminary read-out is conducted by exposing a stimulable phosphor sheet carrying a radiation image of an object stored thereon using a limited irradiation field to stimulating rays of a level lower than the level of stimulating rays used in final read-out and approximately detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected by a light detection means to obtain electric image signals used for reproducing a visible image, read-out conditions in the final read-out are adjusted on the basis of the image information obtained by the preliminary read-out, and the final read-out is carried out by use of the adjusted read-out conditions, the method of adjusting radiation image read-out conditions comprising the steps of:
(i) extracting sample image signals at an arbitrary picture element string, which extends from an end portion of a recording region on said stimulable phosphor sheet towards the center of said recording region, from preliminary read-out image signals obtained by said preliminary read-out,
(ii) expressing changes between image density levels represented by said sample image signals by approximate equations F1, F2, F3, ..., Fn, which are substantially constituted by a simple equation, respectively for picture element groups L1, L2, L3, ..., Ln divided sequentially in a direction from said end portion of said recording region towards the center of said recording region,
(iii) expressing intersecting points of straight lines represented by said approximate equations F1, F2, F3, ..., Fn and an image density change curve in a range higher than a predetermined density level, which is represented by said sample image signals, respectively as P1, P2, P3, ..., Pn, and recognizing a region on a sheet center side with respect to the intersecting point nearest to said end portion of said recording region among said intersecting points P1, P2, P3, ..., Pn as the irradiation field, and
(iv) adjusting said read-out conditions in said final read-out on the basis of the preliminary read-out image information on said region recognized as the irradiation field.

10. A method of adjusting radiation image read-out conditions as defined in claim 9 wherein said irradiation field is of a square shape, and said sample image signals are extracted at two horizontal picture element strings and two vertical picture element strings on said stimulable phosphor sheet.

11. A method of adjusting radiation image read-out conditions as defined in claim 9 wherein said read-out conditions in said final read-out are a read-out gain and a scale factor.

12. A method of adjusting radiation image read-out conditions as defined in claim 9 wherein said stimulating rays are a laser beam.

* * * * *